United States Patent Office 2,769,824
Patented Nov. 6, 1956

2,769,824

HYDROXYLATION OF $\Delta^{17(20)}$-PREGNENES

William P. Schneider and A Vern McIntosh, Jr., Kalamazoo, Mich., assignors to The Upjohn Company, Kalamazoo, Mich., a corporation of Michigan No Drawing. Application April 26, 1954,
Serial No. 425,717

11 Claims. (Cl. 260—397.45)

This invention relates to a novel process for the oxidation of olefins and is particularly directed to improvements in the oxidation of olefins with osmium tetroxide which is particularly characterized by the use of a predominantly non-aromatic amine oxide as a reactant in the oxidation, advantageously in the presence of a catalytic amount of osmium tetroxide.

It is an object of the present invention to provide a novel process for oxidizing olefins involving osmium tetroxide. Other objects will be apparent to those skilled in the art to which this invention pertains.

According to the present invention an olefin, which is preferably a $\Delta^{17(20)}$-21-acyloxy steroid, is oxidized by a mixture of osmium tetroxide, water and a predominantly non-aromatic amine oxide.

The use of osmium tetroxide to convert a double bonded compound into a glycol is a well known reaction. See Gilman, Organic Chemistry, vol. IV, pp. 1180–1184. In this reaction, the osmium tetroxide adds to the double bond to form a cyclic osmate ester, which upon hydrolysis usually with aqueous sodium sulfite yields a glycol. This reaction, while of general application, has been applied with advantage to steroids in U. S. Patents 2,265,143; 2,275,790; 2,492,194; and 2,493,780 where side chain unsaturated pregnane steroids are oxygenated with usually an equimolar amount of osmium tetroxide, followed by hydrolysis with aqueous sodium sulfite, to produce a 17,20-dihydroxypregnane steroid. U. S. Patent 2,493,780 also discloses that hydrogen peroxide can be used with a catalytic amount of osmium tetroxide. Similar hydroxylation reactions involving a double bonded compound, hydrogen peroxide, and a catalytic amount of a metal oxide, may be found in U. S. Patents 2,373,942; 2,402,566; 2,414,385; and 2,437,648.

It is known that the oxidation of olefins by osmium tetroxide is promoted by certain peroxidizing agents, such as, peracids, hydrogen peroxide, alkyl peroxides, and the like. It is also known that certain peroxidizing agents act on pyridine to form pyridine oxide. However, were pyridine and a peroxidizing agent to be used together with osmium tetroxide, the efficacy could not be attributed to the formation of pyridine oxide because pyridine oxide is not effective in the process of the invention to promote oxidation of olefins by osmium tetroxide, in the absence of other oxidizing agents.

In carrying out the process of the invention, any predominately non-aromatic amine oxide can be used. All that is required is to bring the olefin, osmium tetroxide, water, and a predominantly non-aromatic amine oxide together in a reaction mixture, in a suitable solvent. After a suitable period of reaction, the desired oxygenated product can be isolated. By "predominantly non-aromatic amine oxides" are meant those amine oxides in which at least two of the covalent-nitrogen bonds are satisfied by non-aromatic carbon atoms. The predominately aromatic amine oxides, such as the N-alkyldiphenyl amine oxides, triphenylamine oxide, the pyridine and quinoline amine oxides, and the like, are either not active at all or not sufficiently so to be of practical value in the process of the invention. Amines, such is tribenzylamine or dibenzylaniline, are to be considered within the scope of the invention since at least two of the covalent nitrogen bonds are satisfied by non-aromatic carbon atoms. Examples of suitable amine oxides include trimethylamine, triethylamine, methyldiethylamine, dimethylpropylamine; the oxides of the ethanol tertiary amines, e. g., triethanolamine, diethanolmethylamine, dimethylaminoethanol; the oxides of the N-alkyl cyclic amines, e. g., N-methylmorpholine, N-methylpyrrolidine, N-methylpiperidine, N-methylhexamethylenimine; the oxides of the cyclic amino alkanols, e. g., pyrrolidylethanol, piperidylethanol, morpholinoethanol; and the oxides of arylamines and aralkylamines, e. g., the oxides of dimethylaniline, tribenzylamine, etc.

The preferred amine oxides are those amines which are stronger bases than ammonium hydroxide or which have a pK value of less than about five. For the most part, the preferred amine oxides can be represented by the following formula:

wherein $R_1$ and $R_2$ are lower-alkyl groups, hydroxyethyl (ethanol) groups or together represent a saturated group which, together with the amino nitrogen atom, form a saturated cyclic amino group, and $R_3$ is a lower-alkyl or hydroxyethyl group. Compounds thus represented include the oxides of tertiary alkylamines, heterocyclic amines and ethanolamines. Of these, N-methylmorpholine oxide, triethanolamine oxide, and trimethylamine oxide have proven to be particularly efficient.

Amine oxides are a well known class of compounds and many preparations are described in the literature for producing them. Hydrogen peroxide is most frequently employed, although peracetic, perbenzoic, persulfuric or other peracids are sometimes used. Some amines are resistant to conversion to an oxide with hydrogen peroxide and the use of persulfuric acid or the like may be necessary to produce their oxides.

While the process of the invention is broadly applicable to the oxidation of olefins, it is particularly useful in the oxidation of $\Delta^{17(20)}$-21-acyloxy steroids. The process of the invention will therefore be particularly exemplified with reference to such steroids which are represented by the folowing formula:

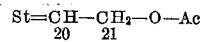

I wherein Ac represents the acyl radical of an organic carboxylic acid, preferably containing from one to eight carbon atoms, inclusive, especially the acyl radical of a lower-aliphatic carboxylic acid, particularly acetic acid, and wherein $St$ represents a steroidal cyclopentanopolyhydrophenanthrene nucleus attached to the above-identified side chain by a double bond at carbon atom 17. Although the nucleus and acyl radicals may contain isolated double bonds, the nucleus of a preferred starting steroid is saturated or contains only a $\Delta^4$-3-keto group, since double bonds in the nucleus are sometimes also affected by the osmium tetroxide and amine oxide. In addition, the nucleus of the starting stearoid, for example, may have a hydroxy, keto, acyloxy, hydrocarbonoxy or benzoyloxy, halogen or oxido group at the 3, 6, 11, 12 or other positions of the stearoid nucleus and the angular methyl groups attached to the 10 and 13 carbon atoms each or both may be present or absent. The preferred starting steroids for the process of the present invention are 3-oxygenated-$\Delta^{17(20)}$-21-acyloxypregnane series steroids, e. g., 3α- and 3β-hydroxy-21-acetoxy-17(20)-pregnene, 3α,21- and 3β,21-diacetoxy-17(20)-pregnene, 3α, 11β- and 3β,11β-dihydroxy-21-acetoxy-17(20)-pregnene, 21-acetoxy-17(20)-pregnene-3-one, 21-acetoxy - 17(20)-pregnene-3,11-dione, 11β-hydroxy-21-acetoxy - 4,17(20)-pregnadiene-3-one, 11α-hydroxy - 21 - acetoxy-4,17(20)-pregnadiene-3-one, 21 - acetoxy-4,17(20)-pregnadiene-3,-11-dione, 21-acetoxy-4,9(11),17(20)-pregnatriene-3-one, 21-acetoxy-9(11)-oxido-4,17(20)pregnadiene-3-one, and other 21-acyloxy esters of the above-named compounds and the like wherein the 21-acyloxy group is, for example, formyloxy, acetoxy, propionyloxy, butyryloxy, dimethylacetoxy, trimethylacetoxy, valeryloxy, hexanoyloxy, octanoyloxy, β-cyclopentylpropionyloxy, diethylacetoxy, benzoxy, phenylacetoxy, phenylpropionyloxy, succinoyloxy, phthaloyloxy, or the like. Of these starting steroids, especially preferred are steroids represented by the following formula:

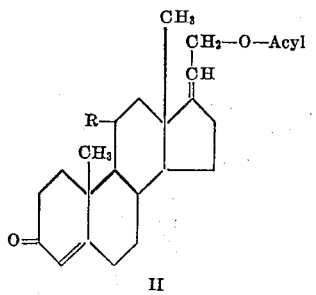

II where Acyl represents the acyl radical of an organic carboxylic acid, preferably a lower-aliphatic acid, especially acetic acid, and wherein R is a hydrogen atom, an α-acyloxy group, preferably lower-acyloxy, e. g., acetoxy, an α-hydroxy group, a β-hydroxy group or ketonic oxygen (=O), since these steroids can be readily converted, utilizing the process of the present invention and then the Serini reaction with zinc and acetic acid, into the cortical hormones corticosterone (Kendall's Compound B) and dehydrocorticosterone (Kendall's Compound A). For example, reacting 21-acetoxy-4,17(20)-pregnadiene-3,11-dione with osmium tetroxide and amine oxide according to the method of the present invention is productive of 17α,20-dihydroxy-21-acetoxy-4-pregnene-3,11-dione. Similarly, 11β-hydroxy-21-acetoxy-4,17(20)-pregnadiene-3-one is converted in the same manner to 11β,17α,20-trihydroxy-21-acetoxy-4-pregnene-3-one. 11α-hydroxy-21-acetoxy-4,17(20)-pregnadiene-3-one is similarly converted to 11α, 17α,20-trihydroxy-21-acetoxy-4-pregnene-3-one. These latter 17α,20-dihydroxy steroids are readily oxidized with chromic acid to andrenosterone.

The starting steroids for the process of the present invention can be produced in several ways. For example, applying the Dimroth reaction [Dimroth, Berichte, 71B, 1334 (1938)] to 17β-hydroxy-20-pregnene steroids is productive of 21-hydroxy, 21-acetoxy, or 21-bromo-17(20)-pregnene steroids which can be converted to other 21-acyloxy steroids according to methods known in the art [see Serini, British 213,630; Berichte, 71B, 1313, 1362 (1938); U. S. 2,267,258, U. S. 2,305,727, British 467,790; Miescher et al., Helv. Chim. Acta, 22, 120, 894 (1939), and Ruzicka and Mueller, 22, 416, 755 (1939)]. Alternatively, these starting compounds can be produced by the method disclosed hereinafter and in copending application Serial No. 307,385.

In carrying out the process of the present invention, a $\Delta^{17(20)}$-21-acyloxy steroid as hereinbefore defined is reacted with a fraction of a molar equivalent of osmium tetroxide in the presence of water and a tertiary amine oxide as defined hereinbefore to produce a 17α,20-dihydroxy-21-acyloxy steroid. The osmium tetroxide need only be employed in a catalytic amount, e. g., less than about 0.2 molar equivalent, calculated on the starting steroid, and preferably less than about 0.02 molar equivalent. If the starting steroid contains a $\Delta^4$-3-keto group, the use of a minimum amount of osmium tetroxide is preferred.

The theoretical amount of water necessary is one molar equivalent, calculated on the starting steroid. However, the reaction proceeds with greater speed and is more efficient in the presence of much larger amounts of water.

The theoretical amount of amine oxide necessary to convert all the starting $\Delta^{17(20)}$-21-acyloxy steroid into 17α,20-dihydroxy-21-acyloxy steroid is one molar equivalent, calculated on the starting steroid. However, it has ordinarily been found to be advantageous to employ more than this theoretical amount, e. g., from about 1.5 to three or more molar equivalents. If there are other double bonds or substituents in the starting steroid which are reactive towards the osmium tetroxide or amine oxide, even larger amounts of the amine oxide may be necessarily employed to achieve complete oxygenation of the 17(20) double bond.

A reaction temperature between about zero and about 100 degrees centigrade is ordinarily employed. When relatively large amounts of osmium tetroxide are employed, the reaction temperature is preferably about ten to about thirty degrees centigrade, e. g., room temperature, whereas when very small amounts of osmium tetroxide are employed, e. g., less than 0.02 molar equivalent, calculated on the starting steroid, the reaction temperature can sometimes advantageously be elevated above about thirty degrees centigrade thereby increasing the reaction rate.

The reaction time varies somewhat according to reaction conditions, starting steroid, starting amine oxide and the amount of osmium tetroxide and water employed. Usually the reaction requires from about one to 48 hours to reach completion under normal operating conditions. The presence of pyridine or like aromatic amine in the reaction mixture usually results in a somewhat more rapid reaction. As stated above, the presence of water in excess of the amount theoretically necessary also results in a speedier reaction.

Usually the starting steroid and the osmium tetroxide are dissolved in the selected reaction solvent and the amine oxide then added thereto. Reaction solvents which may be employed include those commonly employed in osmium tetroxide hydroxylation reactions, e. g., tertiary butyl alcohol, isopropyl alcohol, methanol, ethanol, ether, dioxane, etc., with tertiary butyl alcohol being preferred.

Since it is ordinarily desirous to separate the osmium from the steroidal reaction product, the reaction mixture is usually treated with an agent capable of removing the osmium, e. g., sodium sulfite, hydrogen sulfide, or the like, to precipitate the osmium as free osmium or as an insoluble salt of the added anion. The common procedure heretofore has been to heat the reaction mixture with aqueous sodium sulfite at elevated temperatures, e. g., the refluxing temperature of the mixture. Under these conditions, an acetate group in the reaction product is at least partially hydrolyzed and reacetylation is necessary to produce a completely acetylated reaction product.

When following the preferred conditions of the present invention, the reaction product is mixed with aqueous sodium sulfite at about room temperature or lower to remove the osmium from the reaction mixture. Under these conditions, an acetate or other readily hydrolyzable ester group in the molecule is maintained intact and the reesterification step necessary when following the procedure of the prior art is not needed, thus further enhancing the yield of steroidal product.

The use of low concentrations of osmium tetroxide in the reaction mixture, e. g., less than about 0.02 to about 0.002 molar equivalent, calculated on the starting steroid, results in an insignificant loss in reaction product which may be tied up as an osmate ester at the end of the reaction, if the reaction mixture is not hydrolyzed. If traces of osmium are not undesirable in the reaction mixture, the hydrolysis step may therefore be eliminated when employing the preferred low concentrations of osmium tetroxide in the reaction mixture, further enhancing the simplicity of the reaction.

The following examples are illustrative of the process and products of the present invention but are not to be construed as limited thereto.

PREPARATION 1.—N-METHYLMORPHOLINE OXIDE

To a mixture of 103 grams (1.02 moles) of freshly distilled N-methylmorpholine and 100 milliliters of water was added forty grams (ca. one equivalent) of ninety percent hydrogen peroxide over a period of fifteen minutes. The mixture was cooled during the addition to maintain the reaction temperature below 65 degrees centigrade. After the addition the mixture was maintained at room temperature for twenty hours. Then 150 milliliters of water was added followed by portions of catalase solution until foaming became negligible. The resulting solution was then evaporated at reduced pressure and at forty degrees centigrade. The distillation residue consisted of crystalline needles which were stirred with one liter of acetone. The acetone was then filtered and the crystals dried. This was repeated with aonther liter of acetone and the resulting crystals of N-methylmorpholine oxide, after drying, melted at 73 to 75 degrees centigrade. A sample dissolved in a mixture of acetic acid and potassium iodide did not liberate iodine at room temperature.

PREPARATION 2.—TRIMETHYLAMINE OXIDE

To a fifty-milliliter solution of 16.5 grams (0.279 mole) of trimethylamine in water was added 300 milliliters (0.95 equivalent) of a three percent aqueous solution of hydrogen peroxide. After maintaining the resulting solution for three days at room temperature, the mixture was distilled at reduced pressure to leave a quantitative yield of trimethylamine oxide hydrate as the distillation residue. The trimethylamine oxide hydrate melted at 98 to 100 degrees centigrade and contained a small amount of hydroegn peroxide which was removed by recrystallization of the trimethylamine oxide hydrate twice from acetone. The anhydrous trimethylamine oxide was obtained by a rapid distillation of the hydrate at about 150 degrees centigrade and at one millimeter pressure [Meisenheimer, Ann., 397, 286 (1913)].

PREPARATION 3.—TRIETHANOLAMINE OXIDE

To 74.6 grams (0.50 mole) of triethanolamine was added with stirring 34 grams (0.50 mole) of a fifty percent aqueous solution of hydrogen peroxide over a period of thirteen minutes. The temperature of the mixture rose to forty degrees centigrade. After the reaction mixture was maintained at room temperature for 24 hours, it was diluted with fifty milliliters of water containing a small amount of catalase, causing a small amount of gas to evolve from the mixture. The resulting solution was distilled at about sixty to seventy degrees centigrade at reduced pressure leaving a crystalline residue. This residue was triturated with 200 milliliters of hot acetone. The resulting slurry was cooled and the crystals filtered therefrom. The crystalline triethanolamine oxide thus-obtained melted at 103 to 105 degrees centigrade and gave no titration with ceric sulfate, a reagent sensitive to hydrogen peroxide [Jones and Burns, J. Am. Chem. Soc., 47, 2966 (1925)].

PREPARATION 4.—3,11-DIKETO-4,17(20)-PREGNADIENE-21-OIC ACID METHYL ESTER

To a mixture of 6.4 milliliters of methanolic sodium methoxide, 0.90 milliliter of absolute ethanol, and forty milliliters of dry benzene, which had previously been distilled until sixteen milliliters of distillate had been collected and the mixture then cooled, was added 4.6 milliliters of ethyl oxalate and a solution of 6.56 grams of 11-ketoprogesterone in 76 milliliters of dry benzene. The solution became turbid and a yellow precipitate formed. The reaction mixture was stirred for ninety minutes and 110 milliliters of ether was then added thereto and stirring was continued for sixty minutes followed by the addition of a 260-milliliter portion of ether. The thus-formed yellow precipitate of the sodium enolate of 21-ethoxyoxalyl-11-ketoprogesterone was filtered, washed with several fifty-milliliter portions of ether and after drying weighed 7.30 grams. The ether washings contained 1.08 grams of unreacted 11-ketoprogesterone. The yield of the sodium enolate of 21-ethoxyoxalyl-11-ketoprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

The sodium enolate of 11α-hydroxy-21-ethoxyoxalyl-progesterone, the sodium enolate of 11β-hydroxy-21-ethoxyoxalylprogesterone, the sodium enolate of 11α-acetoxy-21-ethoxyoxalylprogesterone, and the sodium enolate of 21-ethoxyoxalylprogesterone, respectively, are prepared by substituting 11α-hydroxyprogesterone, 11β-hydroxyprogesterone, 11α-acetoxyprogesterone, and progesterone, respectively, for the 11-ketoprogesterone as starting steroid in the above-described reaction.

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 milliliters; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate with methylene chloride containing increasing amounts of acetone. The methylene chloride plus five percent acetone eluates contained 1.2 grams of 3,11-diketo-4,17(20)-pregnadiene-21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, substituting the sodium enolate of 11α-hydroxy-21-ethoxyoxalylprogesterone for the sodium enolate of 11-keto-21-ethoxyoxalylprogesterone used in the reaction described above is productive of methyl 3-keto-11α-hydroxy-4,17(20)-pregnadiene-21-oate. The sodium enolate of 21-ethoxyoxalylprogesterone is similarly converted to methyl 3-keto-4,17(20)-pregnadiene-21-oate.

PREPARATION 5.—3 - ETHYLENE GLYCOL KETAL OF 3,11-DI-KETO-4,17(20)-PREGNADIENE-21-OIC ACID METHYL ESTER

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

*Analysis.*—Calculated for $C_{24}H_{32}O_5$: C, 71.94; H, 8.05. Found: C, 71.90; H, 7.95.

Substituting methyl 3 - keto - 11α - hydroxy-4,17(20)-pregnadiene-21-oate for the methyl 3,11-diketo-4,17(20)-pregnadiene-21-oate as starting steroid in the reaction described above is productive of the 3-ethylene glycol ketal of methyl 3-keto-11α-hydroxy-4,17(20)-pregnadiene-21-oate. Methyl 3-keto-4,17(20)-pregnadiene-21-oate is similarly converted to the 3-ethylene glycol ketal of methyl 3-keto-4,17(20)-pregnadiene-21-oate.

PREPARATION 6.—3-ETHYLENE GLYCOL KETAL OF 11β,21-DIHYDROXY-4,17(20)-PREGNADIENE-3-ONE

A solution of 1.50 grams of the 3-ethylene glycol ketal of 3,11-diketo-4,17(20)-pregnadiene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-dihydroxy-4,17(20)-pregnadiene-3-one in two crops. The first crop, the analysis of which is given below, melted at 191 to 194 degrees centigrade and the second, at 172 to 180 degrees centigrade.

*Analysis.*—Calculated for $C_{23}H_{34}O_4$: C, 73.76; H, 9.15. Found: C, 73.87; H, 9.22.

Substituting the 3-ethylene glycol ketal of methyl 3-keto-11α-hydroxy-4,17(20)-pregnadiene-21-oate as the starting steroid in the above-described reaction is productive of the 3-ethylene glycol ketal of 11α,21-dihydroxy-4,17(20)-pregnadiene-3-one. The 3-ethylene glycol ketal of methyl 3-keto-4,17(20)-pregnadiene-21-oate is similarly converted to the 3-ethylene glycol ketal of 11α,21-dihydroxy-4,17(20)-pregnadiene-3-one.

PREPARATION 7.—11β,21 - DIHYDROXY - 4,17(20)-PREGNADIENE-3-ONE

A solution of 0.572 gram (0.0015 mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

Substituting the 3-ethylene glycol ketal of 11α,21-dihydroxy-4,17(20)-pregnadiene-3-one as the starting steroid in the above-described reaction is productive of 11α,-21-dihydroxy-4,17(20)-pregnadiene-3-one. The 3-ethylene glycol ketal of 21-hydroxy-4,17(20)-pregnadiene-3-one is similarly hydrolyzed to 21-hydroxy-4,17(20)-pregnadiene-3-one.

PREPARATION 8.—11β-HYDROXY-21-ACETOXY-4,17(20)-PREGNADIENE-3-ONE

A solution of 0.518 gram of 11β,21-dihydroxy-4,17(20)-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)-pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 percent of the theoretical, of 11β - hydroxy - 21 - acetoxy - 4,17(20) - pregnadiene - 3-one melting at 183 to 186 degrees centigrade.

*Analysis.*—Calculated for $C_{23}H_{32}O_4$: C, 74.16; H, 8.66. Found: C, 74.18; H, 8.45; C, 73.95; H, 8.74.

Similarly, esterifying 21-hydroxy-4,17(20)-pregnadiene-3-one in the manner described above with acetic anhydride is productive of 21-acetoxy-4,17(20)-pregnadiene-3-one. 11α-hydroxy-21-acetoxy-4,17(20)-pregnadiene-3-one and 11α,21-diacetoxy-4,17(20)-pregnadiene-3-one, respectively, are similarly prepared by employing about a molar equivalent and a large molar excess of acetic anhydride, respectively, in the manner described above with 11α,21-dihydroxy-4,17(20)-pregnadiene-3-one.

Other esters of 11α,21-dihydroxy-4,17(20)-pregnadiene-3-one, 11β,21-dihydroxy-4,17(20)-pregnadiene-3-one and 21-hydroxy-4,17(20)-pregnadiene-3-one are prepared by substituting other acid anhydrides or acid chlorides in the reaction described above, e. g., propionic anhydride, benzoyl chloride, phthalic anhydride, succinic anhydride, oxalyl chloride, trimethylacetyl chloride, cyclopentylpropionyl chloride, diethylacetyl chloride, phenylpropionyl chloride, and the like. The formate esters are ordinarily prepared using 98 percent formic acid and an esterification catalyst. Esters of 21-hydroxy-4,17(20)-pregnadiene-3,11-dione are prepared by the oxidation of the corresponding ester of 11β,21-dihydroxy-4,17(20)-pregnadiene-3-one with chromic acid and under mild conditions.

*Example 1.—11β,17α,20-trihydroxy-21-acetoxy-4-pregnene-3-one*

A. HYDROXYLATION WITH TRIETHANOLAMINE OXIDE

A mixture of 372 milligrams (1.0 millimole) of 11β-hydroxy - 21 - acetoxy - 4,17(20) - pregnadiene - 3 - one, 3.7 milligrams of $OsO_4$, and 0.5 milliliter of pyridine in twenty milliliters of tertiary butyl alcohol containing about 0.1 percent water was stirred for one hour and 496 milligrams (3.0 millimoles) of triethanolamine oxide was then added. The resulting mixture was stirred for twenty hours at room temperature. Twenty milliliters of a 0.5 percent aqueous solution of Na₂SO₃ was added and the mixture stirred for one-half hour. The solution was concentrated to fifteen milliliters by distillation at reduced pressure and then extracted with four fifty-milliliter portions of methylene chloride which were dried and then poured over thirty grams of acid washed alumina. The column was developed with methylene chloride containing increasing amounts of acetone. There was recovered 344 milligrams of steroid from the column, of which 238 milligrams was starting material and 106 milligrams was 11β,17α,20-trihydroxy-21-acetoxy-4-pregnene-3-one. The yield of hydroxylated steroid, calculated on the starting steroid which reacted, was eighty percent of the theoretical.

Similarly, 11β - hydroxy - 21 - acetoxy - 4,17(20)-pregnadiene-3-one is hydroxylated to produce 11β,17α,20-trihydroxy-21-acetoxy-4-pregnene-3-one employing a catalytic amount of osmium tetroxide and dimethylaminoethanol oxide, methyl diethanolamine oxide, pyrrolidylethanol oxide, piperidylethanol oxide, triethanolamine oxide, or other like alkanolamine oxide.

B. HYDROXYLATION WITH N-METHYLMORPHOLINE OXIDE

A solution of 372 milligrams (1.0 millimole) of 11β-hydroxy-21-acetoxy-4,17(20)-pregnadiene-3-one and 350 milligrams of N-methylmorpholine oxide in eighteen milliliters of hot tertiary butyl alcohol containing 0.1 percent water was cooled to room temperature and fifteen milligrams of osmium tetroxide in 1.32 milliliters of tertiary butyl alcohol was added thereto. The resulting solution was diluted to 25 milliliters with tertiary butyl alcohol and maintained at room temperature for eight days. The resulting solution was then mixed with twenty milliliters of an aqueous 0.5 percent Na₂SO₃ solution and then concentrated to a volume of ten milliliters by distillation at reduced pressure. The distillation residue was mixed with fifty milliliters of water to yield 282 milligrams of steroidal precipitate. The mother liquor contained sixty milligrams of steroidal material. The combined steroidal material was dissolved in methylene chloride and chromatographed over ten grams of acid washed alumina, developed with methylene chloride containing increasing amounts of acetone. The methylene chloride plus five percent acetone and plus ten percent acetone eluates contained 109 milligrams of starting steroid. The acetone and acetone plus forty percent methanol eluates contained 192 milligrams of 11β,17α,20 - trihydroxy - 21 - acetoxy - 4 - pregnene-3-one. The yield of hydroxylated steroid, calculated on the starting steroid which reacted, was 73 percent of the theoretical.

In a similar manner, 11β-hydroxy-21-acetoxy-4,17(20)-pregnadiene-3-one is hydroxylated to produce 11β,17α,20-trihydroxy-21-acetoxy-4-pregnene-3-one employing a catalytic amount of osmium tetroxide and N-ethylmorpholine oxide, N-propylmorpholine oxide, N-methylpyrrolidine oxide, N-methylpiperidine oxide, or other like N-alkyl heterocyclic amine oxide.

*Example 2.—Reaction of 11β-hydroxy-21-acetoxy-4,17 (20)-pregnadiene-3-one with trimethylamine oxide*

A. Following the procedure described in Example 1, one millimole of 11β-hydroxy-21-acetoxy-4,17(20)-pregnadiene-3-one was hydroxylated at room temperature for twenty hours employing 8.5 milligrams of osmium tetroxide, the water in the tertiary butyl alcohol, and 150 milligrams of trimethylamine oxide. There was isolated from this mixture 87 milligrams of starting steroid and 85 milligrams of 11β,17α,20-trihydroxy-21-acetoxy-4-pregnene-3-one.

B. A solution of 372 milligrams (1.0 millimole) of 11β,hydroxy-21-acetoxy-4,17(20)-pregnadiene - 3 - one in eighteen milliliters of tertiary butyl alcohol containing 0.04 percent water was prepared, and 333 milligrams (3.0 millimoles) of trimethylamine oxide dihydrate, 0.5 milliliter of pyridine and 3.7 milligrams (0.015 millimole) of osmium tetroxide were added. The solution was diluted with tertiary butyl alcohol containing 0.1 percent water to 25 milliliters and maintained at room temperature for four days. The resulting solution was mixed with twenty milliliters of an aqueous 0.5 percent Na₂SO₃ solution and then concentrated to a volume of ten milliliters by distillation at reduced pressure. The distillation residue was mixed with fifty milliliters of water to precipitate 282 milligrams of steroid. The mother liquor contained 76 milligrams of steroidal material. The combined steroidal material was dissolved in methylene chloride and chromatographed over ten grams of acid washed alumina. Development with methylene chloride plus five percent acetone gave 191 milligrams (51.4 percent) of starting steroid. Development with acetone plus forty percent methanol gave 118 milligrams of 11β,17α,20-trihydroxy - 21 - acetoxy-4-pregnene-3-one. The yield of hydroxylated material, calculated on the starting material which reacted, was 59.5 percent of the theoretical.

C. Following the procedure described in Example 2B above, one millimole of 11β-hydroxy-21-acetoxy-4,17 (20)-pregnadiene-3-one was hydroxylated at room temperature for four days, employing 3.7 milligrams of OsO₄, 333 milligrams of trimethylamine oxide dihydrate, 0.37 milliliter of water, and 0.5 milliliter of pyridine, in sufficient tertiary butyl alcohol containing about 0.1 percent water to make a total volume of 25 milliliters. There was isolated from this mixture 121 milligrams (38 percent) of starting material and 190 milligrams of 11β,17α, 20-trihydroxy-21-acetoxy-4-pregnene-3-one. The yield of hydroxylated steroid, calculated on starting material which reacted, was 75.5 percent.

Similarly, the reaction of trimethylamine oxide, a catalytic amount of osmium tetroxide, water and other Δ¹⁷⁽²⁰⁾-21-acyloxy steroids, for example, 21-acetoxy-4,17(20) - pregnadiene-3,11-dione, 21-acetoxy-4,17(20)-pregnadiene-3-one, 3α,21- or 3β,21-diacetoxy-17(20)-pregnene, 3α,21- or 3β,21-diacetoxy-17(20)-pregnene-11-one, or other acyloxy derivatives of these compounds, and the allopregnenes, e. g., 3β,21-diacetoxy-17(20)-allopregnene, etc., is productive of the corresponding 17α,20-dihydroxy-21-acyloxy steroids.

*Example 3.—17α,20-dihydroxy-21-acetoxy-4-pregnene-3,11-dione*

Following the procedure described in Example 1, 21-acetoxy-4,17(20)-pregnadiene-3,11-dione is hydroxylated with N-methylmorpholine oxide, water and a catalytic amount of osmium tetroxide to produce 17α,20-dihydroxy-21-acetoxy-4-pregnene-3,11-dione.

*Example 4.—11α,17α,20-trihydroxy-21-acetoxy-4-pregnene-3-one*

Following the procedure described in Example 1, 11α-hydroxy-21-acetoxy-4,17(20)-pregnadiene - 3 - one is hydroxylated with triethylamine oxide, water and a catalytic amount of osmium tetroxide to produce 11α,17α,20-trihydroxy-21-acetoxy-4-pregnene-3-one. Similar results are obtained employing 11α,21-diacetoxy-4,17(20)-pregnadiene-3-one which is converted to 11α,21-diacetoxy-17α,20-dihydroxy-4-pregnene-3-one.

*Example 5.—17α,20-dihydroxy-21-acetoxy-4,9(11)-pregnadiene-3-one*

In the same manner as described in Example 1, 21-acetoxy-4,9(11),17(20) - pregnatriene-3-one is converted by the action of ethyl dimethylamine oxide, water, and a catalytic amount of osmium tetroxide into 17α,20-dihydroxy-21-acetoxy-4,9(11) - pregnadiene-3-one. Converting the 9(11) double bond of the starting steroid for this reaction to a 9(11)-oxido group prior to the reaction with ethyl dimethylamine oxide and osmium tetroxide results in the production, in the above described reaction, of 9,11-oxido-17α,20-dihydroxy-21-acetoxy-4-pregnene-3-one.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process for the hydroxylation of a 3-oxygynated-Δ17(20)-steroid having a pregnane carbon skeleton which comprises reacting the steroid with at least one equivalent each of water and a tertiary predominantly non-aromatic amine oxide and less than a molar equivalent of osmium tetroxide to produce the corresponding 17α,20-dihydroxy steroid.

2. The process of claim 1 wherein more than one molar equivalent each of water and the amine oxide and between about 0.02 and 0.002 molar equivalent of osmium tetroxide, calculated on the starting steroid, are employed.

3. The process of claim 1 wherein the amine oxide is represented by the following formula:

wherein R₁ and R₂ are selected from the group consisting of lower-alkyl, hydroxyethyl, and a group in which R₁ and R₂, together with the amino nitrogen, form a saturated cyclic amino group and wherein R₃ is selected from the group consisting of lower-alkyl and hydroxyethyl.

4. The process of claim 1 wherein the amine oxide is trimethylamine oxide.

5. The process of claim 1 wherein the amine oxide is N-methyl-morpholine oxide.

6. The process of claim 1 wherein the amine oxide is triethanolamine oxide.

7. A process for the hydroxylation of a Δ17(20)-21-acyloxy steroid which comprises reacting a steroid represented by the following formula:

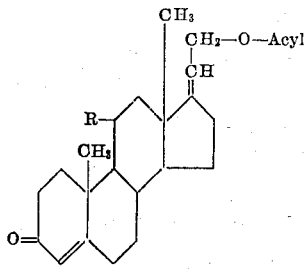

wherein R is an 11-position substituent selected from the group consisting of hydrogen, an α-hydroxy group, a β-hydroxy group, an α-acyloxy group, and ketonic oxygen, and wherein Acyl represents the acyl radical of an organic carboxylic acid containing from one to eight carbon atoms, inclusive, with at least one molar equivalent each of water and a predominantly non-aromatic tertiary amine oxide and between about 0.02 and 0.002 molar equivalent of osmium tetroxide to produce the corresponding 17α,20-dihydroxy-21-acyloxy steroid.

8. The process of claim 7 wherein the amine oxide is represented by the following formula:

wherein R₁ and R₂ are selected from the group consisting of lower-alkyl, hydroxyethyl, and a group in which R₁ and R₂, together with the amino nitrogen, form a saturated cyclic amino group and wherein R₃ is selected from the group consisting of lower-alkyl and hydroxyethyl.

9. The process of claim 7 wherein the reaction is carried out at a temperature above twenty degrees centigrade in tertiary butyl alcohol and wherein the teritary amine oxide is N-methyl-morpholine oxide.

10. The process which comprises mixing 11β-hydroxy-21-acetoxy-4,17(20)-pregnadience-3-one in tertiary butyl alcohol with between about 0.02 and 0.002 molar equivalent of osmium tetroxide and more than one molar equivalent each of water and N-methylmorpholine oxide, conducting the reaction at a temperature above twenty degrees centigrade, and then isolating 11β,17α,20-trihydroxy-21-acetoxy-4-pregnene-3-one from the reaction product.

11. The process of claim 10 wherein the amine oxide is represented by the following formula:

wherein R₁ and R₂ are selected from the group consisting of lower-alkyl, hydroxyethyl, and a group in which R₁ and R₂, together with the amino nitrogen, form a saturated cyclic amino group and wherein R₃ is selected from the group consisting of lower-alkyl and hydroxyethyl.

References Cited in the file of this patent

UNITED STATES PATENTS

| | | |
|---|---|---|
| 2,265,143 | Butenandt | Dec. 9, 1941 |
| 2,275,790 | Miescher | Mar. 10, 1942 |
| 2,492,194 | Sarett | Dec. 27, 1949 |
| 2,493,780 | Sarett | Jan. 10, 1950 |